(12) United States Patent
Zakrzewski et al.

(10) Patent No.: US 12,466,464 B2
(45) Date of Patent: Nov. 11, 2025

(54) STEERING RACK BENDING LIMITER AND STEERING ASSEMBLY THEREWITH

(71) Applicant: STEERING SOLUTIONS IP HOLDING CORPORATION, Saginaw, MI (US)

(72) Inventors: Adam Zakrzewski, Tychy (PL); Marcin J. Nakielski, Tychy (PL); Jaroslaw B. Bujak, Tychy (PL); Konrad Kubik, Tychy (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/074,031

(22) Filed: Dec. 2, 2022

(65) Prior Publication Data

US 2023/0174140 A1 Jun. 8, 2023

(30) Foreign Application Priority Data

Dec. 8, 2021 (PL) .......................................... 439779

(51) Int. Cl.
*B62D 3/10* (2006.01)
*B62D 3/12* (2006.01)

(52) U.S. Cl.
CPC ............. *B62D 3/123* (2013.01); *B62D 3/126* (2013.01)

(58) Field of Classification Search
CPC ........ B62D 3/123; B62D 3/126; B62D 5/001; F16C 33/06; F16C 2326/24
See application file for complete search history.

(56) References Cited

U.S. PATENT DOCUMENTS

| | | | | |
|---|---|---|---|---|
| 2017/0130769 A1* | 5/2017 | Ikeda | ....................... | F16C 35/02 |
| 2020/0070880 A1* | 3/2020 | Kreis | ..................... | B62D 5/006 |
| 2022/0371650 A1* | 11/2022 | Han | .......................... | B62D 3/12 |
| 2022/0396303 A1* | 12/2022 | Monnet | ................. | F16H 55/283 |
| 2023/0213064 A1* | 7/2023 | Feng | ..................... | B62D 5/001 |
| | | | | 280/428 |

FOREIGN PATENT DOCUMENTS

| | | | | | |
|---|---|---|---|---|---|
| CN | 1895946 A | * | 1/2007 | .............. | B62D 3/12 |
| CN | 104943734 A | | 1/2012 | | |
| CN | 105074238 A | | 11/2015 | | |
| CN | 105946964 A | * | 9/2016 | .............. | B62D 3/12 |
| DE | 102017121961 A1 | * | 3/2018 | .............. | B62D 3/126 |
| DE | 102021211639 A1 | * | 4/2022 | ........... | B62D 5/0445 |
| FR | 2979319 A1 | * | 3/2013 | .............. | B62D 3/12 |
| GB | 2522501 A | * | 7/2015 | .............. | B62D 3/12 |
| JP | 2012001070 A | | 9/2015 | | |
| KR | 20020053247 A | * | 7/2002 | .............. | B62D 3/126 |
| KR | 102350046 B1 | * | 1/2022 | | |
| KR | 20220040184 A | * | 3/2022 | .............. | B62D 3/126 |
| WO | WO-2004037627 A1 | * | 5/2004 | .............. | B62D 1/185 |

(Continued)

*Primary Examiner* — Zakaria Elahmadi
(74) *Attorney, Agent, or Firm* — Dickinson Wright PLLC

(57) ABSTRACT

A steering assembly includes a housing having a bore, and a non-plastic support ring disposed within the bore. The non-plastic support ring has an annular wall with an outer periphery and an inner periphery. A plurality of rack engagement features extend radially inwardly from the inner periphery of the annular wall. The plurality of rack engagement features are arranged to engage a steering rack to prevent bending of the steering rack.

20 Claims, 5 Drawing Sheets

(56) References Cited

FOREIGN PATENT DOCUMENTS

| WO | WO-2015014618 A1 | * | 2/2015 | ............... | B62D 3/12 |
| WO | WO-2019078254 A1 | * | 4/2019 | ............... | B62D 3/12 |
| WO | WO-2020213423 A1 | * | 10/2020 | ............... | B62D 3/12 |
| WO | WO 2021009964 | * | 1/2021 | ............... | B62D 5/04 |
| WO | WO-2021009964 A1 | * | 1/2021 | ............... | B62D 3/12 |

* cited by examiner

STEERING RACK BENDING LIMITER AND STEERING ASSEMBLY THEREWITH

CROSS-REFERENCE TO RELATED APPLICATION

This application claims the benefit of Poland Patent Application Serial No. P.439779, filed Dec. 8, 2021, which is incorporated herein by reference in its entirety.

FIELD

The embodiments described herein relate generally to vehicle steering systems and, more particularly, to a steel support ring for preventing rack bending during curb push-away.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire (SbW) and driver interface steering. Often times, these various steering schemes include an electric power steering (EPS) system including components such as steering wheel, column, rack-pinion gear, electric motor actuator, for example. The EPS helps the operator to steer a vehicle by providing necessary assist torque. The assist torque is based on an operator's applied torque. In a steady-state sense, the operator torque and assist torque counter the rack force generated because of tire-road interaction.

In a curb push-away, a vehicle is parallel parked with the right side wheels contacting a curb. The driver rotates the steering wheel to push the vehicle away from the curb by using the force on the wheels. This may subject a steering gear or rack housing to bending loads. In performing these tests, the load is applied in the direction of steering rack teeth. Traditional plastic insert rings may deform in this maneuver. Other loads, such as impact loads, may cause a similar undesirable deformation.

A typical solution to this problem is to increase the rack bar diameter or reduce the distance between the tie rod and rack-and-pinion intersection point, though these solutions come at a high cost and may not be acceptable from a packaging perspective.

With reference now to FIGS. 2A and 2B, a prior art steering assembly 20' includes a plastic ring 50' configured to sit tight and in contact with a steering gear rack 52'. This prior art steering assembly 20' has elevated levels of friction, involves the plastic ring 50' being installed on the rack instead of the housing, may deform elastically and plastically under significant load, does not provide a travel stop function, and may not prevent the rack from disengaging when the rack yoke is not present.

With reference now to FIGS. 3A and 3B, another prior art steering assembly 20" includes a plastic ring 50" configured to sit in the housing. This prior art steering assembly 20" has elevated levels of friction, may deform under significant load, does not provide a travel stop function, and may not prevent the rack from disengaging when the rack yoke is not present.

SUMMARY

In accordance with one aspect of the invention, a steering rack bending limiter for inhibiting bending of a steering rack includes a non-plastic support ring having an annular wall with an outer periphery and an inner periphery. A plurality of rack engagement features extend radially inwardly from an inner periphery of the annular wall. The plurality of rack engagement features are arranged to engage the steering rack to prevent bending of the steering rack.

In accordance with another aspect, a steering assembly includes a housing having a bore, and a non-plastic support ring disposed within the bore. The non-plastic support ring has an annular wall with an outer periphery and an inner periphery. A plurality of rack engagement features extend radially inwardly from the inner periphery of the annular wall. The plurality of rack engagement features are arranged to engage a steering rack to prevent bending of the steering rack.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
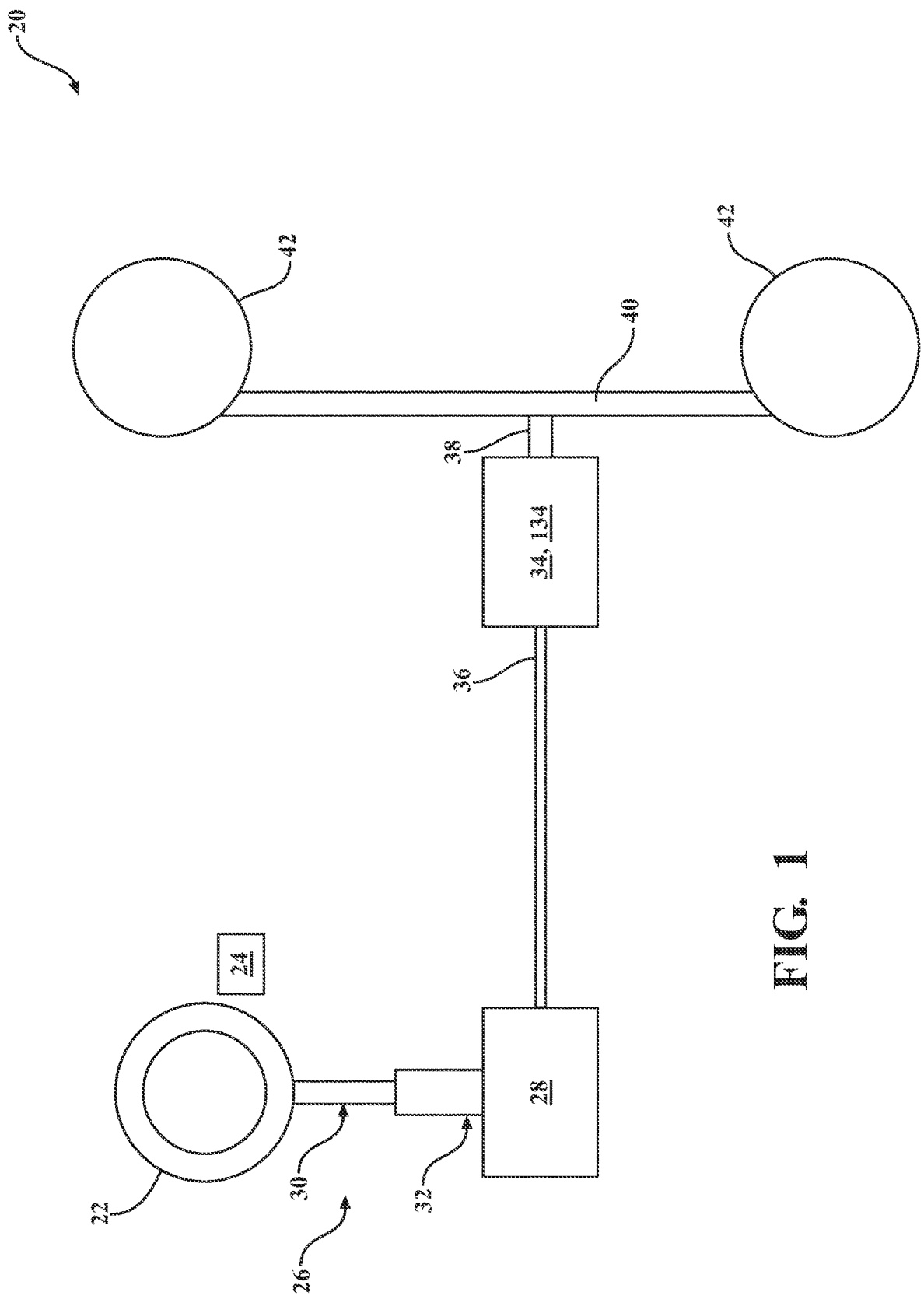
FIG. 1 schematically illustrates a steering system including a power assist assembly according to the present disclosure.
Figure 2B:
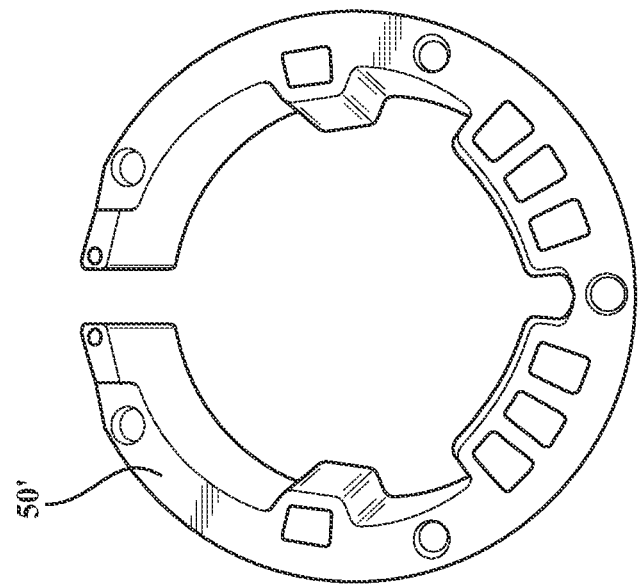
FIGS. 2A and 2B are perspective views of a prior art steering system.
Figure 2A:
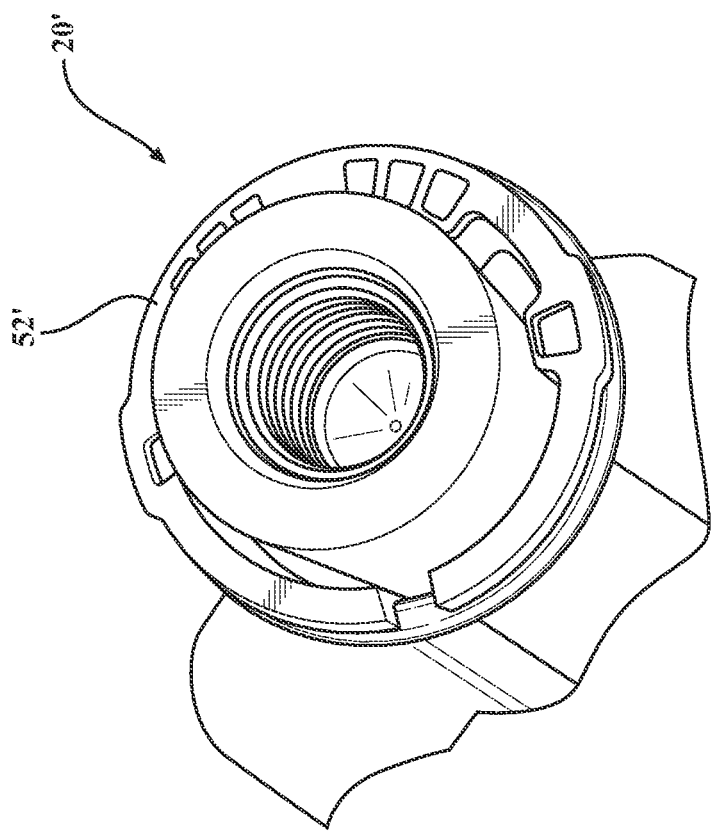
Figure 3B:
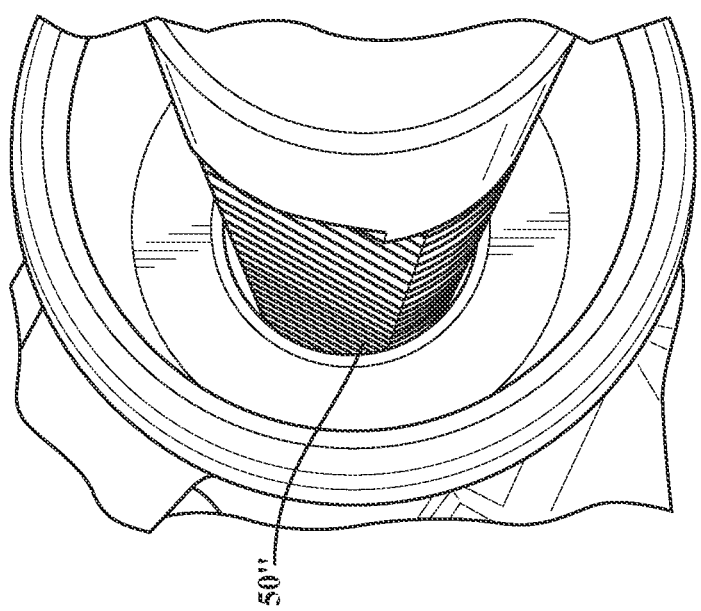
FIGS. 3A and 3B are perspective views of another prior art steering system.
Figure 3A:
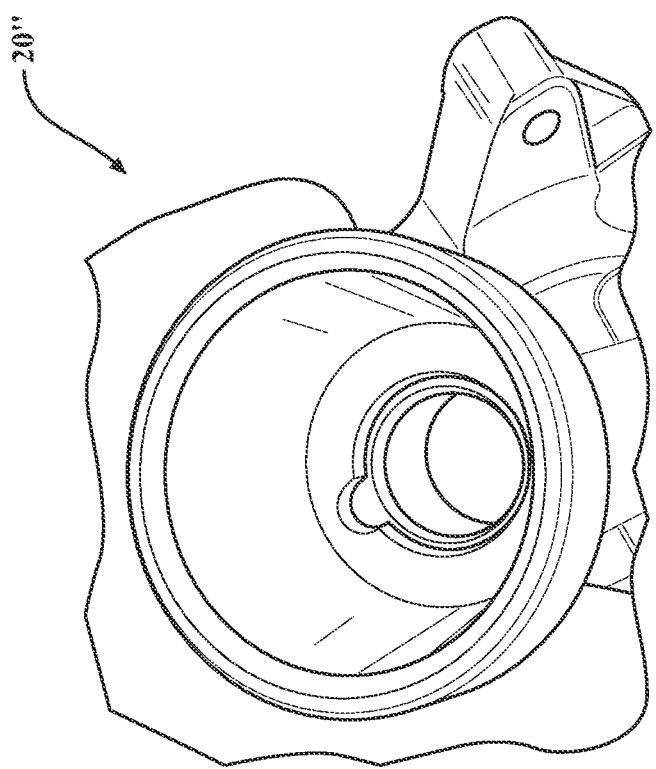

The following discussion is directed to various embodiments of the disclosure. The embodiments disclosed herein should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present invention described herein may be incorporated into a car, a truck, a sport utility vehicle, a mini-van, a crossover, any other passenger vehicle, any suitable commercial vehicle, or any other suitable vehicle. Moreover, principles of the present disclosure may apply to other vehicles, such as planes, boats, trains, drones, or other suitable vehicles. Moreover, the present invention may be incorporated into various steering system schemes and electric power steering (EPS) systems.

Referring now to the drawings, where the various embodiments are shown and described herein, without limiting same.

Referring initially to FIG. 1, a steering system 20 is generally illustrated. The steering system 20 may be configured as a driver interface steering system, an autonomous driving system (ADS), or a system that allows for both driver interface and autonomous steering. The steering system may include an input device 22, such as a steering wheel or other HWAs, wherein a driver may mechanically provide a steering input by turning the steering wheel. An airbag device 24 may be located on or near the input device 22. A steering column 26 extends along an axis from the input device 22 to an output assembly 28. The steering column 26 may include at least two axially adjustable parts, for example, a first portion 30 and a second portion 32 that are axially adjustable with respect to one another. The output assembly 28 may include a pinion shaft assembly, an I-shaft, a cardan joint, steer-by-wire (SbW) components or any other features conventionally located opposite the input device 22. The output assembly 28 may connect to a power-assist road-wheel actuator 34 (RWA) via a connection 36. The connection 36 may be one of a steering gear input shaft, a continuation of the pinion shaft assembly, or wired or wireless digital communication protocols.

The power-assist assembly 34 may include steering gear components 38 such as a rack-and-pinion, a recirculating ball-type steering gear, or any other types of steering gear assemblies associated with autonomous, driver-interface steering systems, or combinations thereof. The power-assist assembly 34 may then operably connect to a drive axle assembly 40 via the steering gear components 38. In operation, actuation of the driver input 22 causes a responsive movement of the power-assist assembly 34 and causes the drive axle assembly 40 to turn driving wheels 42 of an associated vehicle. The power-assist assembly 34 may be part of a single pinion electronically assisted power steering (SPEPS) system, a dual pinion electronically assisted power steering (DPEPS) system, a column electrical power steering (CEPS) system, or a recirculation ball-type rack electrical power steering (REPS) system.

Figure 4B:
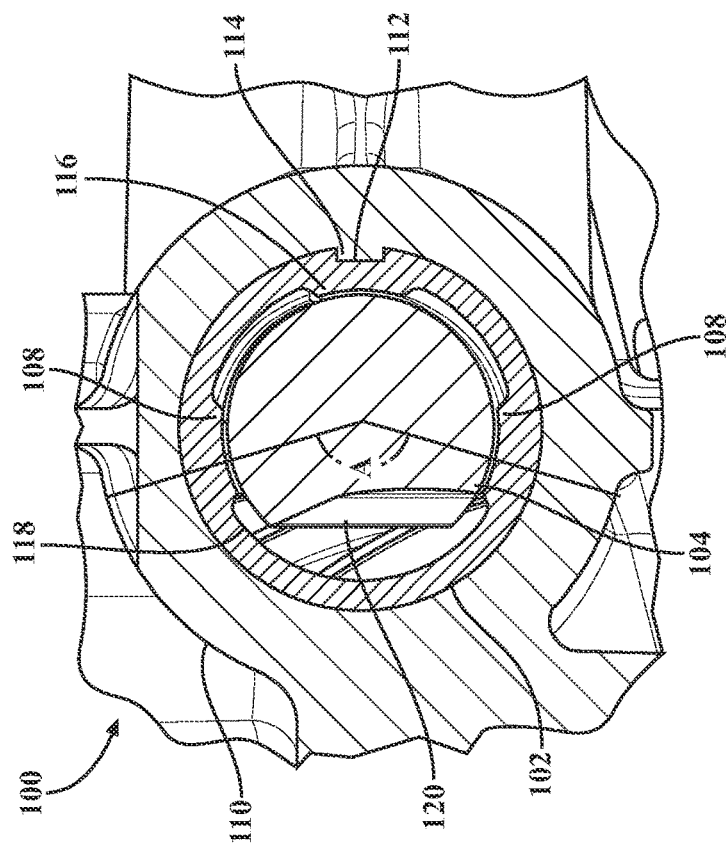
FIG. 4B is a cross-sectional view of a steering system with the support ring of FIG. 4A.
Figure 4A:
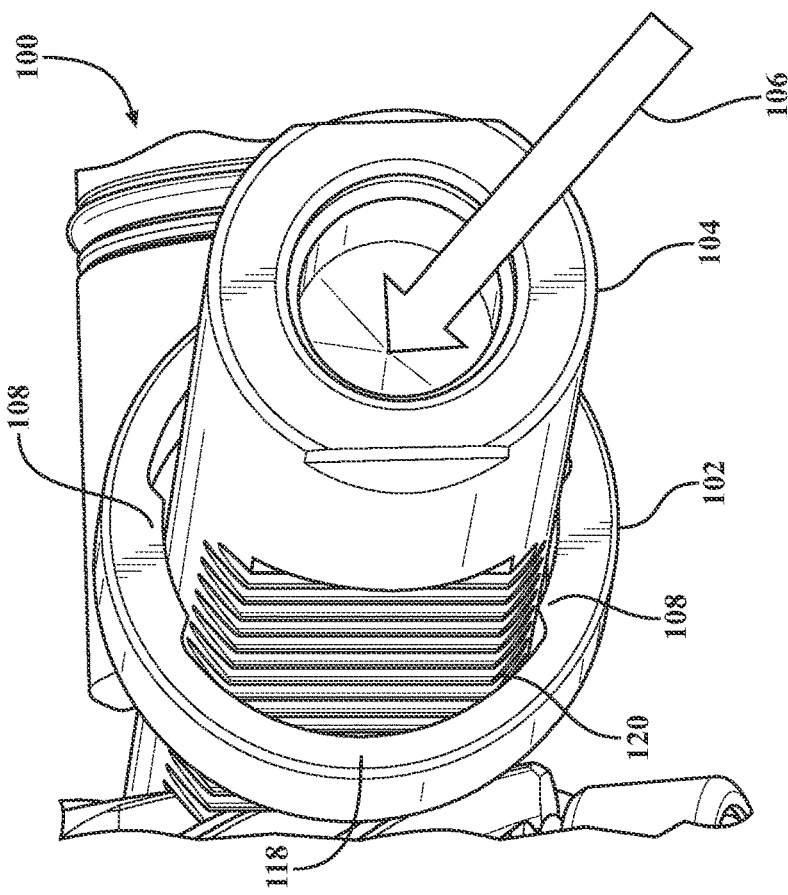
FIG. 4A is a perspective view of a steering system with a support ring constructed in accordance with an aspect of the disclosure.
Figure 5B:
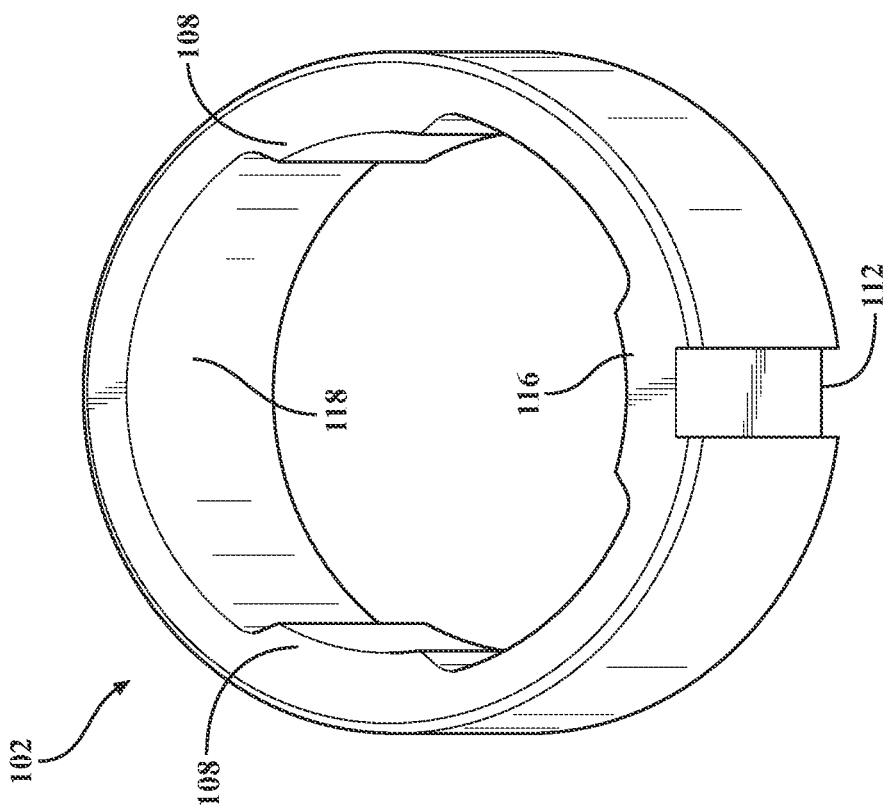
FIGS. 5A and 5B are different perspective views of the support ring of FIGS. 4A and 4B.
Figure 5A:
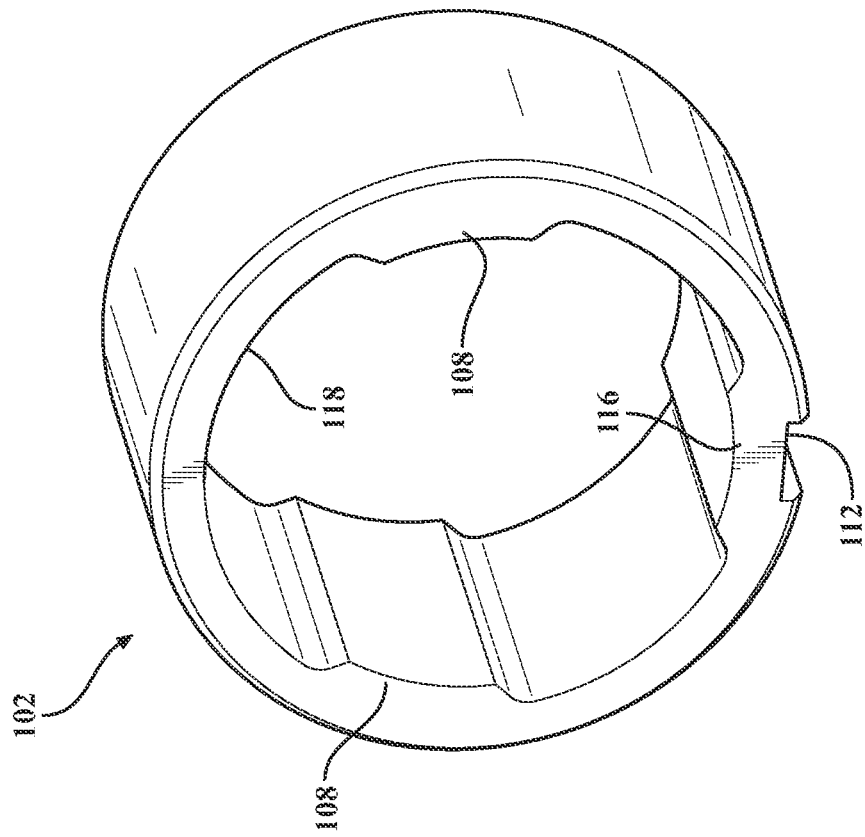

FIGS. 4A and 4B illustrate an embodiment of a steering assembly 100 having a rack bending limiter to inhibit bending of a steering rack 104. The rack bending limiter includes a circumferentially continuous, annular non-plastic support ring 102 (i.e., bending limiter), such as a steel support ring 102, by way of example and without limitation. It is to be understood that the non-plastic support ring 102, referred to hereafter as metal support ring 102, can be made of other strong, durable metal materials, as would be understood by a person possessing ordinary skill in the art (POSA). FIGS. 5A and 5B illustrate perspective views of the metal support ring 102 according to aspects of the present disclosure. In the embodiment shown in FIGS. 4A and 4B, the steering assembly 100 includes metal support ring 102 configured to be disposed about the steering rack 104. An arrow 106 (FIG. 4A) indicates the load direction in case of curb push-away or other side impact loads on the wheel/axle. The metal support ring 102 limits bending of the rack 104 within a housing 110 without having to increase the size (diameter) of the rack 104 or otherwise shorten the distance between a tie rod and rack-and-pinion intersect point, as is typically required with prior art plastic support rings (FIGS. 2A, 2B, 3A, 3B).

The metal support ring 102 includes a plurality of rack engagement features, shown as two rack engagement features 108, protruding radially inward from an annular inner periphery of an annular wall of the metal support ring 102 and slightly offset from mirrored relation with one another in generally opposite relation from one-another, to prevent bending of the steering rack 104. Accordingly, the two rack engagement features 108 are in non-mirrored relation from one another across a central axis of the annular wall of the metal support ring 108. As shown, engagement features 108 are offset asymmetrically across a central axis of the metal support ring 102, and in an exemplary embodiment illustrated, at an interior angle A of 125 degrees from each other. It will be appreciated that other angles are contemplated within the scope of the invention and this disclosure, such as +/−30 degrees, by way of example and without limitation. The metal support ring 102 is further disposed inside the housing 110. In some embodiments, the metal support ring 102 is press-fit with a slight interference fit into a bore of the housing 110. The press-fit ensures axial retention of the metal support ring 102 in the bore, though a stake may also be used to provide a redundant mechanism of axial retention. The metal support ring 102 includes a detent 112 on an outer periphery of the annular wall of metal support ring 102. The detent 112 is disposed between the two rack engagement features 108, shown as being equidistantly spaced from the rack engagement features 108. The detent 112 is shown, by way of example and without limitation, as being a recessed notch extending into an otherwise cylindrical outer surface defining the outer periphery. The housing 110 includes a locating feature configured to mate with the detent 112 to fixedly orient the metal support ring 102 with respect to the housing 110 and the steering rack 104. The locating feature is shown as a protrusion 114 extending radially inwardly from a generally cylindrical inner surface bounding the bore of the housing 110. The protrusion 114 is configured to be disposed in the detent 112 of the metal support ring 102 to ensure proper radial orientation of the metal support ring 102 within the housing 110, thereby assuring the metal support ring 102 is properly oriented relative to the steering rack 104. The protrusion 114 is shown as being configured for a close mating fit within the detent 112.

Proximate the detent 112, on the inner periphery of the metal support ring 102, is a third rack engagement feature 116 configured to engage the steering rack 104 and prevent the steering rack 104 and pinion from disengaging when a rack yoke is not present. As such, the steering rack 104 is captured against shifting radially from its lengthwise central axis by the two rack engagement features 108 and the third rack engagement feature 116. The third rack engagement feature 116 is shown being radially aligned with the detent 112, and thus, being equidistantly spaced from the rack engagement features 108.

Diametrically opposite the detent 112 and the third rack engagement feature 116 is a large protrusion-free interior zone 118 formed as a smooth cylindrical sector on the inner periphery of the metal support ring 102 and configured to provide spacing between the metal support ring 102 and teeth 120 of the steering rack 104. The spacing helps prevent damage to the teeth 120 of steering rack 104 during loading. With the orientation of the metal ring 102 relative the steering rack teeth 120 being precisely controlled, the protrusion-free interior zone 118 is assured of being properly oriented opposite the teeth 120, thereby assuring the proper spacing is provided opposite the teeth 120 to prevent inadvertent damage to the teeth 120 during loading.

The metal support ring 102 therefore allows for a steering assembly 108 with improved resistance to steering rack 104 bending and deformation during loading and has a travel stop feature, while not requiring more parts (as the steel support ring replaces the traditional insert ring) or adding friction to the system. It will be appreciated that the metal support ring 102 illustrated may be made from any number of non-plastic or non-plastically deformable materials or composite materials. A non-limiting example might be powdered metal, bronze or composite material comprising layers of different materials.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

Having thus described the invention, it is claimed:

1. A steering rack bending limiter for inhibiting bending of a steering rack, comprising:
   a non-plastic support ring having an annular wall with an outer periphery and an inner periphery, a plurality of rack engagement features extending radially inwardly from the inner periphery, the entire inner periphery, including the plurality of rack engagement features, being arranged for a clearance relation from the steering rack to avoid contact with the steering rack upon being assembled with the steering rack and during a non-bending state of the steering rack, with the rack engagement features being arranged to engage the steering rack during bending of the steering rack to limit the bending of the steering rack.

2. The steering rack bending limiter of claim 1, further including a detent on the outer periphery of the annular wall, the detent being configured to mate with a locating feature of a housing.

3. The steering rack bending limiter of claim 2, wherein the support ring is sized to be press-fit into the housing.

4. The steering rack bending limiter of claim 2, wherein the detent is a recessed notch extending radially inwardly into the outer periphery and the locating feature is a protrusion extending radially inwardly from a generally cylindrical bore of the housing for receipt in the recessed notch to ensure proper orientation of the support ring relative to the steering rack.

5. The steering rack bending limiter of claim 1, wherein the support ring is formed of steel.

6. The steering rack bending limiter of claim 4, wherein the plurality of rack engagement features includes a pair of rack engagement features arranged in offset, non-mirrored relation from one another across a central axis of the annular wall.

7. The steering rack bending limiter of claim 6, wherein the plurality of rack engagement features includes a third rack engagement feature configured in clearance relation from the steering rack.

8. The steering rack bending limiter of claim 7, wherein the third rack engagement feature extends radially inwardly from the inner periphery away from the detent in radially aligned relation with the detent.

9. The steering rack bending limiter of claim 7, wherein the third rack engagement feature is between the pair of rack engagement features, the inner periphery diametrically opposite the third rack engagement feature being a cylindrical sector to form a spacing between teeth of the steering rack and the cylindrical sector.

10. A steering assembly, comprising:
    a housing having a bore; and
    a non-plastic support ring disposed within the bore, the non-plastic support ring having an annular wall with an outer periphery and an inner periphery, a plurality of rack engagement features extending radially inwardly from the inner periphery, the entire inner periphery, including the plurality of rack engagement features, being arranged in clearance relation from a steering rack when the steering rack is under a non-bending load, with the rack engagement features being arranged to engage the steering rack when the steering rack is under a bending load to limit bending of the steering rack.

11. The steering assembly of claim 10, further including a detent on the outer periphery of the annular wall, the detent being configured to mate with a locating feature of the housing.

12. The steering assembly of claim 11, wherein the non-plastic support ring is sized to be press-fit into the bore of the housing.

13. The steering assembly of claim 11, wherein the detent is a recessed notch extending radially inwardly into the outer periphery and the locating feature is a protrusion extending radially inwardly from a generally cylindrical inner surface bounding the bore into the recessed notch to ensure proper orientation of the support ring relative to the steering rack.

14. The steering assembly of claim 10, wherein the non-plastic support ring is steel.

15. The steering assembly of claim 13, wherein the plurality of rack engagement features includes a pair of rack engagement features arranged in offset, non-mirrored relation from one another across a central axis of the annular wall.

16. The steering assembly of claim 15, wherein the plurality of rack engagement features includes a third rack engagement feature equidistantly spaced from the pair of rack engagement features.

17. The steering assembly of claim 16, wherein the third rack engagement feature extends radially inwardly from the inner periphery away from the detent in radially aligned relation with the detent.

18. The steering assembly of claim 16, wherein the third rack engagement feature is between the pair of rack engagement features, the inner periphery diametrically opposite the third rack engagement feature being a cylindrical sector to form a spacing between teeth of the steering rack and the cylindrical sector.

19. The steering rack bending limiter of claim 1, wherein the plurality of rack engagement features each have circumferentially extending, arcuate inner surfaces arranged in clearance relation from the steering rack when the steering rack is under the non-bending load.

20. The steering assembly of claim 10, wherein the plurality of rack engagement features each have circumferentially extending, arcuate inner surfaces arranged in clearance relation from the steering rack when the steering rack is under the non-bending load.

\* \* \* \* \*